March 5, 1929. H. G. YOUNG 1,704,115
APPARATUS FOR WASHING AND SEPARATING SAND AND GRAVEL
Filed Aug. 7, 1923 2 Sheets-Sheet 1
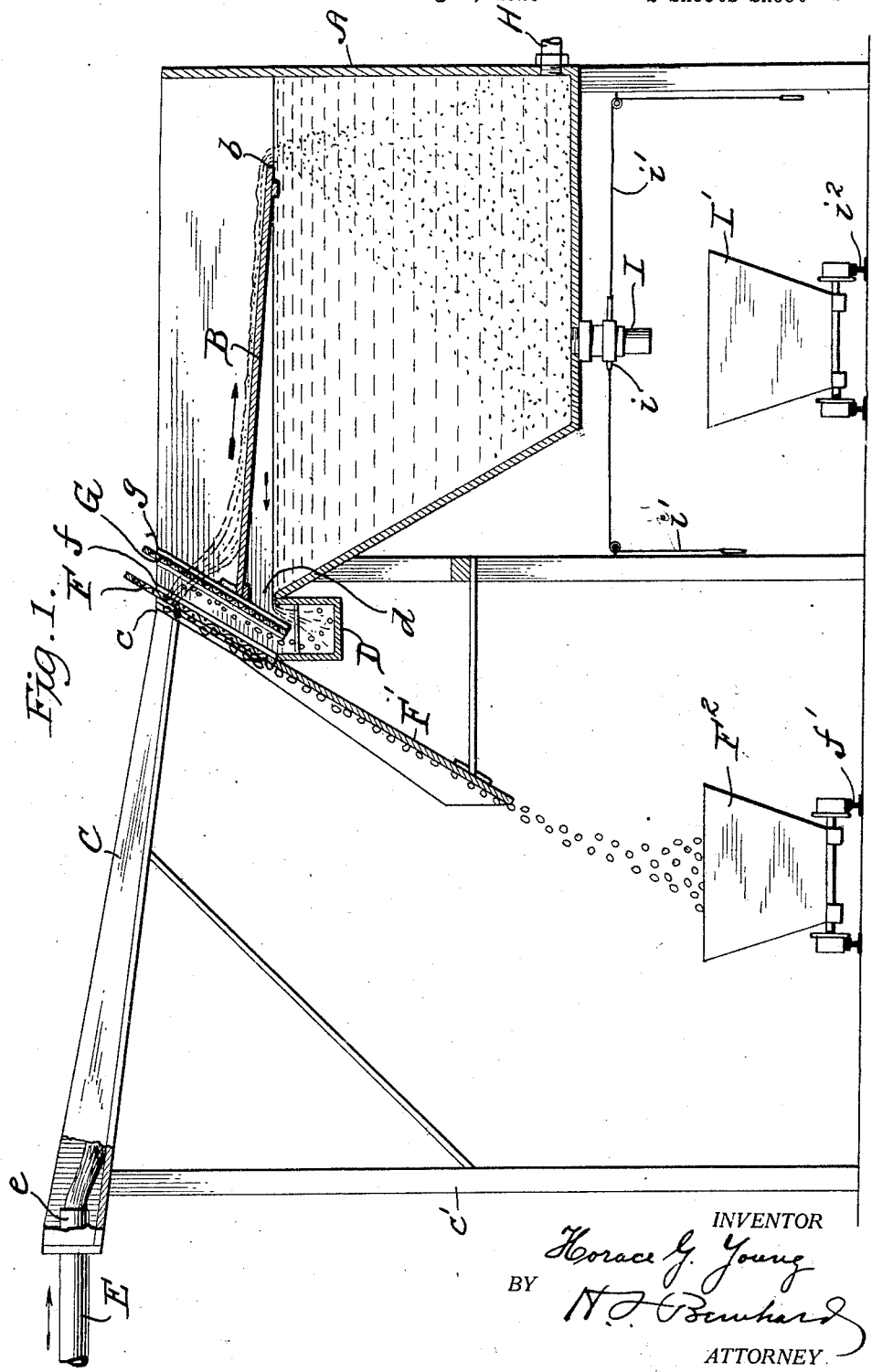
INVENTOR
Horace G. Young
BY
ATTORNEY

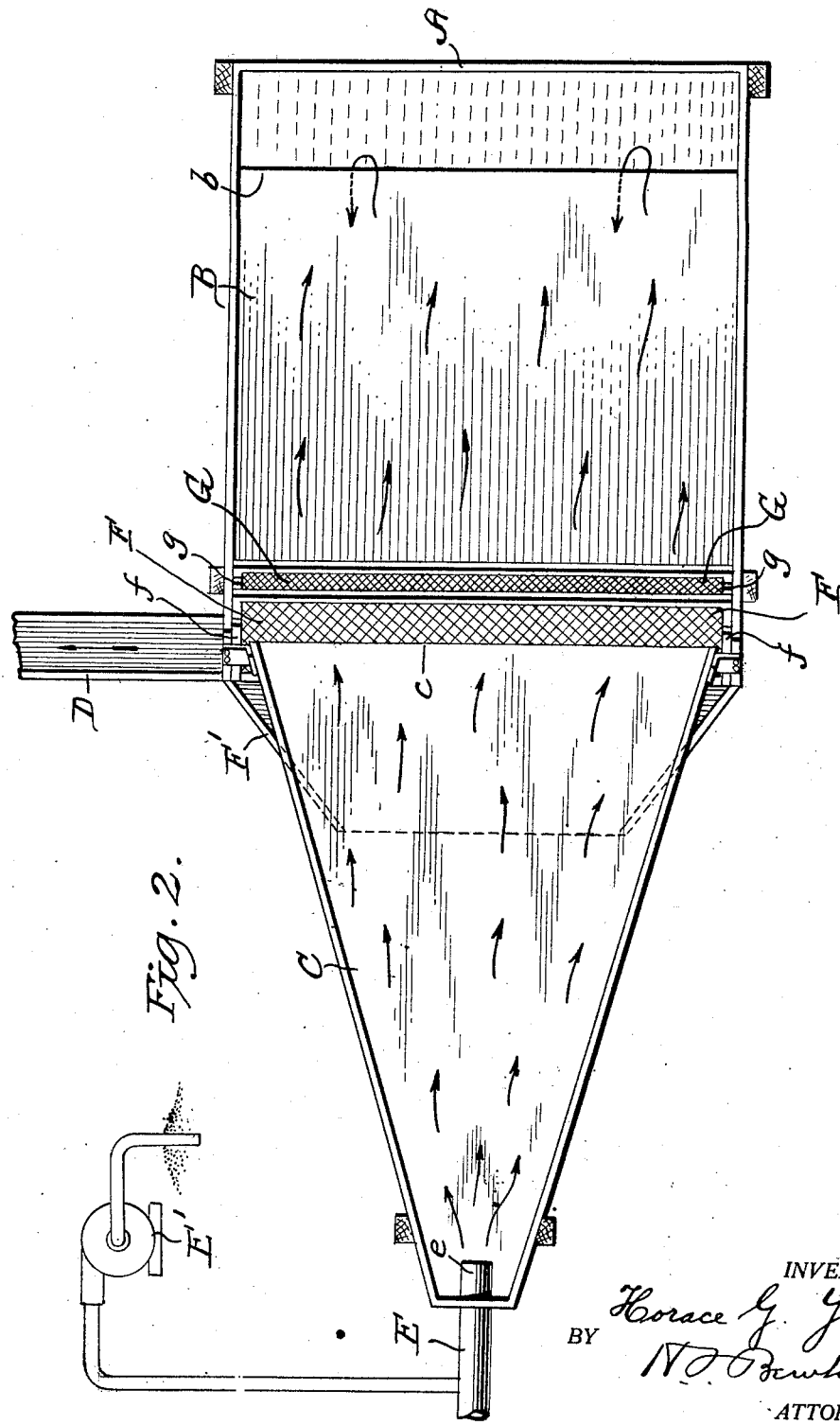

Patented Mar. 5, 1929.

1,704,115

UNITED STATES PATENT OFFICE.

HORACE G. YOUNG, OF NEW YORK, N. Y.

APPARATUS FOR WASHING AND SEPARATING SAND AND GRAVEL.

Application filed August 7, 1923. Serial No. 656,187.

This invention is an apparatus for separating sand from gravel by an hydraulic operation, and the object is to wash gravel and sand while effecting the separation thereof, and without the expenditure of labor or power, whereby the operations are conducted economically and the sand and gravel are accumulated in separated masses, each in a clean washed condition, free from silt and foreign matter, to the end that the gravel, and sand, either or both, are at once available for building or industrial purposes.

According to my invention, the material is conducted from a pit, bank or other deposit by the movement of an hydraulic current to a flow table upon which the water and the material are deposited and over which the material is carried by the current, said table directing the water and material against or into contact with a screening mechanism. This latter mechanism intercepts the gravel so as to separate pebbles of certain sizes from the water and the sand, the gravel being discharged into an appropriate receiver, whereas the water passes through the screen and carries the sand and silt with it. If desired, one or more additional screens may be used, intermediate the first named screen and a second flow table, the latter being in a plane below the first named flow table and inclined relatively thereto, said second flow table being in operative relation to a sand settling tank within which the sand is collected and through which the water is free to pass into and through an overflow leading to a discharge flume, whereby the outflowing water carries off with it any vegetable and foreign matter including the dirt and silt and the sand is accumulated within the tank, to be drawn off as and when required.

Other functions and advantages of the invention will appear from the following description taken in connection with the drawings, wherein—

Figure 1 is a sectional elevation of a washing and separating apparatus embodying my invention, and Figure 2 is a plan view thereof.

A designates a settling chamber herein shown as a tank open at the top and closed at the bottom and sides. Positioned over, or within the open top, of said tank is a flow table, B, the same being the second flow table hereinbefore mentioned, and adjacent this table B is the other flow table, C, the latter being the first flow table hereinbefore mentioned. Table B is supported fixedly within the tank in any suitable way, and it is inclined at an angle suitable for the flow by gravity of the hydraulic current and the material. One end of table B terminates short of a side wall of the tank so as to provide for the discharge at $b$ of the current and the material, but the other higher end of said table B overhangs the overflow outlet $d$ from the tank to the receiving end of a flume D, the latter extending transversely with respect to the tank and projecting for a suitable distance to one side of said tank, see Figure 2.

The flow table C is at one side of the tank, with a delivery end $c$ adjacent the loading end of table B, said table being elevated with respect to table B and said table C being, furthermore, inclined toward table B, see Figure 1, the angle of inclination of table C being such as to insure the free flow of the hydraulic current and the materials carried thereby over said table C. As shown, table C is supported in a raised position by a framework $c'$.

The hydraulic current and the materials are supplied to the table C by appropriate means, the same being shown as a pipe or main E leading to a pumping apparatus indicated diagrammatically at E' in Figure 2, the same being positioned at a gravel pit more or less submerged in water, it being intended according to one mode of procedure to supply water and the materials from an appropriate source or sources of supply.

As shown, the delivery end $e$ of the hydraulic feed main or pipe E overhangs the table C, and the table widens laterally from the delivery end $e$ of the main, as shown in Figure 2, to the end that the hydraulic current will diffuse or spread over the table and thus reduce the velocity of the hydraulic curent, although it is apparent that such current is required to carry the materials over table C to the screening mechanism. The delivery end $c$ of table C is over the receiving end of the transverse flume D.

Positioned intermediate the flow tables B C are one or more screens F G dependent upon the character of the materials to be washed and separated. As shown, two screens are used, each being retained in a fixed position by appropriate guide ways $f\ g$ securely attached to the side walls of tank A, said screens being insertible into and removable from the guideways $f\ g$ as and when required or desired, so that one screen may be used, as screen F, or two screens F G may be used as shown, or both screens may be dismounted, dependent upon the character of the material or materials to be washed and collected.

The screens F G are separated one from the other for an appreciable interval, and they are shown as being parallel, but it is required that the screens shall be positioned at an angle crosswise of the flow tables B C and between the delivery of table C and the loading end of table B, the angle of inclination of screens F G being such as to discharge by gravity the material or materials which lodge against the surfaces of said screens or which materials may be retained by the meshes of the screen so as to be prevented from passing therethrough under the flow or head of the hydraulic current. The screen F is near the discharge end $c$ of flow table C, and with this screen co-operates a chute F' by which the gravel of a certain size or sizes is delivered into a pile or into a receiver, shown in Figure 1 as a tank car $F^2$ adapted to run on a trackway $f'$, whereby gravel is loaded automatically into means for transporting the same. The screen G is adjacent the receiving end of table B and in overhanging relation to the receiving end of flume D, the purpose of said screen G being to permit the sand and silt to pass through the meshes thereof and to be carried over the table B by the flow of water and so on into tank A, whereas the grit and fine pebbles which are washed through screen F will be caught on the screen G and deflected into flume D with the ultimate purpose of being carried off with the water flowing through the flume D and thus either returned to the gravel pit or collected in a separate pile to be available for certain industrial purposes.

As shown, the tank A is provided with two sand outlets, one being a pipe H leading from one side thereof, whereas the other is a pipe I leading from the bottom and provided with a gate valve $i$ operated by suitable means, such as cords $i'$, for controlling the outflow of wet sand into a suitable receiver, such as a tank car I' adapted to the trackway, $i^2$, whereby the sand collected within tank A may be loaded automatically into means for transporting the same.

In operation, with screens F G in position between the flow tables, the pump forces water in the required volume, and at the desired velocity to the pipe or main E and the hydraulic current carries the materials to the flow table C. The water spreads over the surface of the table and washes the materials against the screen F, the latter retaining the gravel and directing the same in a washed condition to the chute F' by which the washed gravel is loaded into a car or other conveyer. The water with the sand, fine gravel and silt pass through screen F, and the fine gravel and grit will lodge against screen G so as to be deflected by said screen into the flume D, whereas the sand and water pass through screen G and fall upon table B, over which the sand is washed by the flow of water, the sand and water passing into tank A. The sand is precipitated into the tank within which it accumulates until discharged through pipes H or I, whereas the water passes out through overflow $d$ and thence into flume D so as to wash away the grit and fine gravel which are discharged from screen G into said flume. The water flowing out of the tank at overflow $d$ carries with it the fine silt and foreign matter such as loam, clay and other undesirable materials which are not separated from the hydraulic current by the action of the screens.

Obviously, screen G may be withdrawn from service by sliding it out of the guideway $g$, screen F remaining in position. All the materials passing with the water through screen F will be washed from table B and pass into the tank until said tank becomes filled up with sand, whereas the water rushing through the apparatus will wash the sand (when the tank becomes filled with sand) over the spillway or overflow $d$ so that the sand is carried back to the pit or to storage, the screen F acting to separate gravel only and to discharge the same into the car. Again, screen F may be removed and screen G allowed to remain in position, thus allowing all materials retained on screen G to enter the flume D and to be discharged from the apparatus, the sand and water flowing into the tank, whence the water escapes through the overflow and the sand is accumulated within the tank. Furthermore, both screens F G may be dismounted, whereupon the water washes all the materials from table C onto table B and such materials are washed by the water into the tank in a way to intermix the pebbles and sand while eliminating foreign matter, with the result that the mixed sand and gravel accumulates within the tank and results in a washed product known in the trade as "run of pit" material available for construction work.

From the foregoing it will be understood that my invention functions as an apparatus for washing gravel and sand in an economical manner for the reason that no moving parts are employed requiring operation by power other than the pump, and labor is minimized. The gravel and sand are graded by appropriate screens to separate such materials as gravel or pebbles, concrete sand, plaster sand, brick sand, etc. from which undesirable foreign substances are eliminated by the washing operation.

Having thus fully described the invention, what I claim as new and desire to secure by Letters Patent is:

1. A sand and gravel separator embodying a settling chamber, a plurality of flow tables elevated above the settling chamber, with the receiving end of one of said flow tables spaced relatively to the delivery end of another of said flow tables, said flow tables being inclined generally in the same direction and with one of said tables extending beyond the other flow table for discharging its load directly into said settling chamber, hydraulic pumping mechanism for feeding water and materials to one of said flow tables, a flume below an overflow from the settling chamber, said flume extending crosswise of the flow tables, and a plurality of screens positioned intermediate the spaced end portions of said flow tables for intercepting the materials flowing over the first of said flow tables, said screens being inclined oppositely to the inclination of said flow tables and one of said screens overhanging the flume for discharging material directly thereto.

2. A sand and gravel separator embodying a settling chamber provided with an overflow for water and with a discharge gate for drawing off sand adapted to accumulate within said chamber, two inclined flow tables positioned in elevated relation to said settling chamber, one of said flow tables discharging directly to said settling chamber and the adjacent ends of said two flow tables being separated one from the other, a plurality of parallel screens positioned in the space which separates the two flow tables, said screens being inclined oppositely to the angle of inclination of said flow tables, means for delivering a stream of water, sand and gravel, whereby the flow of said stream is tranquilized by the large area afforded by said flow tables, a flume below the overflow from the tank and adjacent one of said screens and a gravel chute adjacent the delivery of the other screen.

In testimony whereof I have hereto signed my name this 6th day of August, 1923.

HORACE G. YOUNG.